United States Patent [19]

Edwards et al.

[11] 4,181,791

[45] Jan. 1, 1980

[54] PROCESS FOR PREPARING ARALKYLENE PHENOL RESINS PREPARED FROM PHENOLS AND ARALKYLENE ESTERS

[75] Inventors: Alfred G. Edwards, Stourport-on-Severn; Glyn I. Harris, Hagley, both of England

[73] Assignee: Albright & Wilson Limited, Warley, England

[21] Appl. No.: 620,534

[22] Filed: Oct. 6, 1975

[30] Foreign Application Priority Data

Oct. 7, 1974 [GB] United Kingdom ............... 43345/74

[51] Int. Cl.² ...................... C08G 63/10; C08G 63/18; C08G 75/26
[52] U.S. Cl. .......................................... 528/179; 528/8; 528/9; 528/12; 528/14; 528/18; 528/23; 528/26; 528/29; 528/166; 528/167; 528/169; 528/171; 528/174; 528/176; 528/180; 528/181; 528/190; 528/191; 528/193

[58] Field of Search .............. 260/47 C, 49, 167, 169; 528/176, 179, 180, 181, 190, 191, 193, 166, 171, 174, 8, 9, 26, 29, 12, 23, 14, 18

[56] References Cited

U.S. PATENT DOCUMENTS

| | | | |
|---|---|---|---|
| 2,331,169 | 10/1943 | Bruson | 260/405 |
| 3,313,778 | 4/1967 | Sakurai et al. | 260/49 |
| 3,828,006 | 8/1974 | Thomas | 260/47 C |

FOREIGN PATENT DOCUMENTS

1150203  4/1969  United Kingdom .

*Primary Examiner*—Lester L. Lee
*Attorney, Agent, or Firm*—Frishauf, Holtz, Goodman & Woodward

[57] ABSTRACT

Aralkylene phenol resins, curable to thermoset polymers are made by reacting an aralkylene ester of formula $R'(CH_2OYR,)_a$, where $R'$ is aromatic, Y is carbonyl or sulphonyl and $R'$ is alkyl or aryl, a is 2 or 3 with a molar excess of a phenol or mixture thereof with a non-phenolic aromatic compound.

13 Claims, No Drawings

PROCESS FOR PREPARING ARALKYLENE PHENOL RESINS PREPARED FROM PHENOLS AND ARALKYLENE ESTERS

This invention relates to a process for preparing a resin capable of being cured to a thermoset polymer.

In our British Pat. No. 1150203, we describe the reaction of (I) an aralkyl ether of the general formula R'—(CH₂OR)ₐ and/or an aralkyl halide of the general formula R''—(CH₂X)ₐ, wherein R' is a divalent or trivalent aromatic hydrocarbon or hydrocarbonoxy - hydrocarbon radical, R'' is a divalent or trivalent aromatic hydrocarbon radical, R' and R'' optionally containing inert substituents in the aromatic nucleus, R is an alkyl radical containing up to 6 carbon atoms, X is chlorine, bromine or iodine and a has a value of 2 or 3, with a molar excess of (2) a phenolic compound or a phenolic compound and a compound containing aromatic nuclei. The product is a curable resin having at least some repeating units of formula

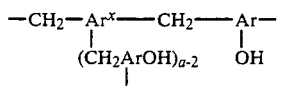

where Ar$^x$ is R' or R'' and ArOH represents the phenolic compound, and is terminated by ArOH groups.

The aralkyl ether reaction has several advantages over that with the aralkyl halide, but suffers from a disadvantage in that the ether is generally made from the halide, by alkoxylation with the desired alcohol of formula ROH and an alkali metal hydroxide. The halide is generally made by halogenation of the corresponding compound of formula R'(CH₃)ₐ or R''(CH₃)ₐ, a reaction producing many side products with I or 3 or more halogen atoms per molecule.

We have now found a new method of preparing resins of the above type.

The present invention provides a process for preparing a curable resin which comprises reacting (I) an aralkylene ester of formula R'(CH₂OYR')ₐ wherein R' is as defined above and R' is an alkyl group of 1–6 carbon atoms, or an aryl group of 6–13 carbon atoms, Y is a carbonyl or sulphonyl group, and a is 2 or 3, with a molar excess of (2) a phenolic compound or a mixture of a phenolic compound and a non-phenolic compound.

In the general formula R' represents any divalent or trivalent aromatic hydrocarbyl or aromatic hydrocarbyloxy aromatic hydrocarbyl radical, for example the m - or p-phenylene radical, a diphenylene radical, a diphenylene oxide radical e.g. a bis (p-phenylene) oxide radical, a 2,6 naphthylene radical or a 1,3,5-phenylene tri radical.

Thus both mono nuclear, and fused and unfused poly nuclear radicals may be represented by R'. Especially when Y is a carbonyl group, R' is preferably an unsubstituted alkyl radical of 1 to 4 carbon atoms, especially a methyl radical. Especially when Y is a sulphonyl group, R' is preferably a mononuclear aryl group e.g. of 6–8 carbon atoms such as a phenyl, tolyl, xylyl or halophenyl e.g. bromophenyl group. The preferred aralkylene compounds are those in which a has a value 2, particularly p-xylylene α,α'-diacetate, p-xylylene α,α'-dibenzene sulphonate and p-xylylene α,α'-di-p-toluene sulphonate.

If desired the R' radical may contain at least one substituent which is a phenyl group, alkyl group of 1–4 carbon atoms e.g. a methyl group or a halogen atom attached to the aromatic nucleus the substituent or substituents being inert under the conditions of the reaction. The presence of chlorine or fluorine atoms in some or all of the available positions in the aromatic nucleus is advantageous in that it leads to improved flame resistance in the resulting polymeric products. An example of such a substituted aralkylene di ester, which may be employed according to this invention, is 2,3,5,6-tetrachloro - 1,4 - di(acetoxymethyl) benzene.

The term "phenolic compound" as employed herein includes any compound or mixture of compounds containing 1 to 3, preferably 1 or 2, hydroxyl radicals joined to the aromatic nucleus, at least two of the ortho and para positions to a hydroxyl group being unsubstituted and there being a total of not more than 3 substituents attached to ring carbon atoms of the phenolic benzene nucleus apart from the one essential hydroxyl group and any non hydroxylic substituents being inert under the conditions of the reaction. Thus the phenolic compounds may be of formula

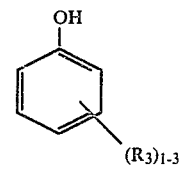

where each R₃ is hydroxyl, alkyl of 1 to 8 carbon atoms, e.g. methyl, ethyl, isopropyl, tert. butyl or tert. octyl, halogen e.g. chlorine, nitro, phenyl, hydroxylphenyl, hydroxphenyl alkyl e.g. hydroxy phenylmethylene, -ethylene and -isopropylidene. Preferably the phenolic compounds contain only one aromatic ring. Examples of the phenolic compounds are phenol, p- cresol, m - cresol, resorcinol, catechol, 4-methyl catechol, isopropyl catechol, diphenylol propane (bis 2,2-(4 - hydroxy phenyl) propane), diphenylolethane, monoalkyl phenols such as p-ethylphenol, p-tert. butyl phenol and p-tert. octyl phenol, m - and p - phenyl phenol, pyrogallol and phloroglucinol. Mixtures of the phenols can be used e.g. resorcinol or another dihydric phenol with phenol itself or mixtures of 4 -methylcatechol with catechol and other dihydric phenols. These mixtures or phenol, resorcinol or catechol alone are preferred. A mixture of phenol and β- naphthol can also be used as described in British Pat. Specification No. 1362268.

Examples of the compound containing aromatic nuclei, which may be mixed with the phenolic compound in the formation of the resin, are diphenyl - or dibenzyl - ether, terphenyl, diphenylamine, diphenyl sulphide diphenyl, anthracene, diphenylsulphone, triphenyl phosphate, octaphenylcyclotetrasiloxane, aryl substituted borazoles and metal complexes such as ferrocene. The proportion of aromatic compound can vary within wide limits but is not sufficient to prevent satisfactory curing of the reaction product with the hardening agent e.g. hexamethylene tetramine. Further details of the aromatic compound and the proportions in which it is used, are given in British Pat. Specification No. 1150203.

The reaction to form the resin is carried out with one mole of aralkylene ester and a molar excess of the phenolic compound or mixture thereof with the aromatic compound. Preferably at least 1.3 moles of phenolic compound (or mixture) per mole of aralkylene ester are used. From 1.3 to 3 moles of the phenolic compound are suitably employed for every mole of the aralkylene ester. When the molecular proportion falls below the specified 1.3:1 ratio and approaches 1:1 the reaction mixture exhibits an increased tendency to gel prematurely. When in the aralkylene ester a is 2 and the ratio of phenol to ester is greater than 2.5, the resulting products become more difficult to cure. Polymeric products having the highest softening points are obtained when the ratio of the phenolic compound to aralkylene ester is at the low end of the specified range. Preferably when a in the ester is 2 the phenolic compound is employed in a ratio of 1.3:1 to 2:1 e.g. 1.3 to 1 to 1.7 to 1, especially 1.4 to 1.6:1. When a in the ester is 3, the phenolic compound is preferably employed in a ratio of 2:1 to 3:1 e.g. 2.5:1 to 3:1.

The reaction between the phenolic compound and the aralkylene ester involves condensation of the ester groups in the aralkylene compound with nuclear hydrogen atoms in the phenolic compound with the elimination of the corresponding acid of formula R·COOH or R·SO$_2$OH. Preferably the process of an invention is carried out in the presence of a catalyst for this reaction for example certain ball clays or a Friedel Crafts type catalyst such as stannic chloride, zinc chloride or ferric chloride. Other catalysts are those described in British Pat. Specification No. 1363531 e.g. cupric sulphate or chloride, and also dialkyl sulphates where the alkyl group has 1–6 carbon atoms e.g. dimethyl, diethyl and dipropyl sulphates, and mixtures thereof. Diethyl sulphate is the preferred catalyst. The quantity of catalyst is not critical and from 0.01–1% by weight (based on the weight of reactants (1) and (2)) has been found to be sufficient for most purposes, especially 0.02–0.4%, although up to 3% or more may be used if desired. The catalyst may be added as such or as a solution or dispersion in a compatibilising solvent, for example methyl alcohol. When cupric sulphate is employed as an alcohol solution this is preferably used when freshly prepared in view of the tendency of the components to the formation of a complex.

The reactants can be dissolved in a suitable high boiling inert organic solvent e.g. an aromatic compound with a deactivated ring such as a chlorobenzene or nitrobenzene or an alkane carboxylic acid e.g. of 2 to 7 carbon atoms; the condensation with the carboxylate ester can be conveniently carried out in an excess of carboxylic acid as solvent.

The reaction to prepare the resin is generally carried out by heating the reactants together at a suitable temperature usually at least 100° C. e.g. 100°–200° C., conveniently until the by-product acid of formula R·COOH or R·SO$_3$H is liberated. The by-product carboxylic acid is preferably distilled out of the reaction mixture unless it is also the solvent; this acid may be recycled for preparation of the aralkylene carboxylic ester. The reaction time depends on such variables as the nature of the reactants, the type and quantity of catalyst and the reaction temperature, but is usually 5 min to 24 hr. The reaction is preferably continued until the liberation of by-product acid is substantially complete. At the end of the reaction the by-product carboxylic acid (if any remains) and solvent (if any) are evaporated by heating under vacuum e.g. 1–50 mm Hg usually at the reaction temperature. The evaporation also removes any unreacted volatile phenolic compound, so it is desirable that the reaction be substantially complete before the evaporation is started when volatile phenols e.g. monohydric ones such as phenol itself are being reacted.

In the case of the sulphonic acid by-product, the residual by-product acid may be removed from the crude acid by filtration from a solution of resin in a solvent such as a dialkyl ketone of 3–8 carbon atoms e.g. methyl ethyl ketone in which the sulphonic acid is insoluble. The sulphonic acid may alternatively be left in the resin. When the phenol is volatile, any excess of it in the crude resin product can be removed by evaporation under vacuum at high temperature.

The starting material esters of this process of general formula R'(CH$_2$OOCR·)$_a$ may be prepared by a variety of routes, including (a) treatment of the corresponding halides of formula R'(CH$_2$X)$_a$ wherein R', a and X are defined above with an alkali metal salt of the carboxylic acid of formula R·COOH, (b) treatment of the corresponding aralkyl quaternary ammonium salt with the alkali metal carboxylate, the quaternary ammonium salt being prepared from the halide and tertiary amine of formula (R$_4$)$_3$N where R$_4$ is an alkyl group of 1 to 6 carbon atoms, e.g. a methyl or ethyl group, and (c) catalysed air oxidation of the corresponding hydrocarbon of formula R'(CH$_3$)$_a$ or monoester of formula CH$_3$R'CH$_2$OOCR· in the presence of the carboxylic acid of formula R·COOH e.g acetic acid and catalytic amounts of a mixture of the stannous carboxylate and palladous carboxylate. The latter process is described in detail in J. Org. Chem. 1969, 34, 1106–1108, which also provides references to the other two preparative techniques.

In process (a) the halide is treated with the carboxylate of an alkali metal which is usually the potassium or sodium salt, the reaction preferably being carried out in solution in a solvent which is the corresponding carboxylic acid, when it is liquid at the reaction temperature, or an inert solvent such as chlorobenzene or a dipolar material such as dimethyl- formamide, dimethyl sulphoxide, dimethyl acetamide or hexamethyl phosphoramide. Usually 1–1.5 moles of carboxylate are used per equivalent of halogen in the halide, e.g. 2–25 moles carboxylate per mole of p-xylylene dichloride. The process generally requires heating e.g. at 50°–150° C. for 1–4 hours, usually for 2–3 hrs e.g. at the reflux temperature of acetic acid. The ester may be reacted as such in the carboxylic acid solution with the phenolic compound or mixture with the non-phenolic compound. Alternatively the ester may be isolated by distribution of the reaction mixture between water and an organic solvent e.g. an aromatic hydrocarbon such as benzene toluene or xylene, washing the organic extract until neutral, drying and isolation by distillation or crystallization. The by-product carboxylic acid from the production of the resin can be recycled for use in this process as such if suitable as in the case of acetic acid or after conversion into the corresponding alkali metal salt with an alkali metal carbonate, bicarbonate or less preferred hydroxide.

Preferably, the process (a) for making the ester is integrated with the conversion of the ester to the resin. Such a process will be described with reference to the preferred carboxylate ester, the acetate, in which R· is CH$_3$, but is equally applicable to carboxylate esters from propionic and butyric acids. In such a process, the aralkylene chloride is treated with sodium or potassium acetate in acetic acid solution to give a solution of aralkylene ester in acetic acid together with by-product sodium or potassium chloride. The solution is concentrated by evaporation of acetic acid to precipitate the chloride salt which is filtered off. This concentration stage may be omitted, if there is a subsequent washing of the resin. The aralkylene acetate solution is analysed for its aralkylene acetate content and then to the solution is added the appropriate amount of the phenolic compound. The reaction between aralkylene acetate and the phenol occurs usually with distillation of acetic acid and usually after addition of a catalyst, to give the resin and more acetic acid. When the reaction is substantially complete, the acetic acid is evaporated under heat and vacuum to leave the resin. If the recovered acid contains any unreacted volatile phenol, the latter may be separated e.g. by fractional distillation. The recovered acetic acid is either all used as solvent for the preparation of the ester from the halide, but preferably the desired amount of it is converted to the sodium or potassium salt for reaction with the halide, the remainder of the acetic acid providing the solvent for the reaction. The base used for the conversion is usually the carbonate or bicarbonate of sodium or potassium, though the hydroxides could be used but are more expensive. Thus this process can be used to convert the aralkylene halide to the resin with use of a much cheaper base than the alkali metal hydroxide used in the conversion of halide to resin via the aralkylene ether.

In process (c), the hydrocarbon of formula $R'(CH_3)_a$ is mixed with the carboxylic acid, usually in 4–20 molar excess and the palladous and stannous carboxylates in a total weight ratio based on the hydrocarbon usually of 1:20 to 1:1, preferably 1:4–1:8, are dissolved in the mixture. The corresponding alkali metal carboxylate e.g. the potassium carboxylate is also added to the mixture, usually in an amount 0.8–1.5 moles per mole of hydrocarbon or 0.05–0.5 moles per mole of carboxylic acid. The total amount of palladium and tin carboxylates are usually 0.001–0.5 moles per mole of the carboxylic acid, the amount of palladium salt usually being 0.0005 to 0.02 moles per mole of carboxylic acid and 0.005 to 0.2 moles per mole of hydrocarbon, and the amount of tin salt usually being 0.001 to 0.05 moles per mole of carboxylic acid and 0.01 to 0.5 moles per mole of hydrocarbon. Charcoal is also preferably present. Into the reaction mixture is passed air, though undiluted oxygen, oxygen enriched air, or oxygen diluted with another inert gaseous diluent may be used. Passage of the gas containing molecular oxygen through the mixture causes evaporation of the hydrocarbon, which is preferably stripped from the gaseous effluent and returned to the reaction mixture. The reaction time and temperature depend on the nature and amount of the various reactants but it has been found that times of 10–48 hr, e.g. 20–40 hr. with heating at e.g. 50°–150° C. e.g. 80°–120° C. are suitable. The extent of reaction can be monitored by glpc analysis on the reaction mixture. The initially produced product is the corresponding mono ester of formula $(CH_3)R'CH_2OOCR\cdot$ and this is the main contaminant in the diester together with minor amounts of the asymmetric diester of formula $CH_3R'CH(OOCR\cdot)_2$. The reaction can be worked up by separation of any insolubles and then evaporation of the carboxylic acid under vacuum and distribution of the residue between an organic solvent; e.g. an aromatic hydrocarbon such as benzene, toluene or xylene, or a dialkyl ether such as diethyl ether or halogenated aliphatic hydrocarbon such as methylene dichloride and water and washing, drying and evaporation of the solvent; alternatively, the initial evaporation of carboxylic acid may be omitted. The carboxylic acid evaporated during the work up procedure and from the ester/phenolic compound reaction can be recycled for use as such or for conversion to the necessary salts.

The sulphonyl ester starting materials of formula $R'(CH_2OSO_2R\cdot)_a$ can be prepared by an analogous process to that of process (a) or (b) above using an alkali metal sulphonate instead of the carboxylate and with reaction not in the corresponding acid but in the dipolar solvent.

Alternatively, the sulphonyl ester starting materials may be made from the corresponding alcohols of formula $R'(CH_2OH)_a$, by reaction with the sulphonic acid in the presence of a base e.g. an alkali metal hydroxide or a sulphonyl halide of formula $R\cdot SO_2$ Hal where Hal is chlorine or less preferred bromine, usually in the presence of a base e.g. pyridine or triethylamine which may also act as solvent. The alcohols are generally made by hydrolysis of the corresponding halides of formula $R'CH_2X$, in the presence of acid or base.

The resin prepared by reaction of the ester and phenolic compound has at least some repeat units of formula

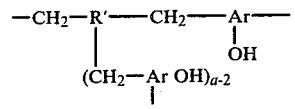

and has an ArOH group in each terminal position. Where there is no non-phenolic aromatic compound mixed with the phenolic compound, as is usually the case, the resin consists essentially of the above repeat units with the phenolic ends.

The resin can be cured by heating with cross linking agents known for curing novalac resins, especially hexamethylene tetramine (Hexamine), though quinone, chloranil, anhydroformaldehyde aniline and ethylenediamine formaldehyde may also be used. The amount of curing agent, which will be exemplified by hexamine, is generally 5–30% of the weight of the resin, preferably 8–20% especially 10–17% e.g. 12.5% by weight. The resin and curing agent are heated together usually to 80°–250° C. for a period usually of 30 min to 30 hr. preferably to 150°–200° C. for 1–12 hr. Post curing at 160°–250° C. for 1–24 hr can also be carried out if desired. Instead of a single stage heating to produce a solid infusible thermoset product, the resin and all or some of the curing agent can be heated together to form a partially condensed product which is advantageously still soluble in organic solvents, and then final curing is carried out with addition of more curing agent or further heating. Thus for example 10–70% of the total amount of hexamine can be added in the first stage and the remainder added in the final stage. The two stage curing process is advantageous when the initial resin is a viscous liquid difficult to handle while the intermediate product is a solid or when the resin is used as the binder for a laminate, for in this case the solution of intermediate product instead of resin can be used as impregnant in the production of prepregs to avoid the problems of the poor solubility of hexamine in common organic solvents.

The mixture of resin and curing agent may be used in solution as a coating composition e.g. for metals such as steel or aluminium as a lamp capping cement or as impregnant for woven or non woven filaments e.g. glass cloth, asbestos paper or asbestos fibre cloths in the production of laminates by consolidation of the initially produced prepregs under heat and pressure. Examples of suitable solvents are e.g. methyl isobutyl ketone or methyl ethyl ketone, methylisoamyl ketone, isophorone, diacetone alcohol, cyclohexanone, cellosolves such as 2-ethoxyethanol, cellosolve ether e.g. the methyl ether or cellosolve esters e.g. the acetate, any of which solvents can be mixed with an aromatic hydrocarbon such as benzene, toluene or xylene or a hydrocarbon such as white spirit or solvent naphtha or an alcohol e.g. of 1 to 6 carbon atoms, such as methanol, ethanol or n-butanol. The resin is usually present in the organic solvent solutions in an amount of 5-90% preferably 20-50% by weight. The mixing can be carried out at a low temperature e.g. 20°-30° C. and the mixture stored until required, but the mixing of the curing agent with the remainder of the components is usually carried out at a higher temperature e.g. about 60° C. for several hours e.g. 1-4 hours, and then the mixture cooled to room temperature and stored until required.

The mixture of resin and curing agent can also be used for the production of moulded articles. Organic or inorganic fillers can be added e.g. asbestos flour, mica, chopped glass strands and silica. The inorganic filler and resin will normally be present in a weight ratio of 0.05:1 to 4.0:1 e.g. 0.2 to 1:1. Other ingredients such as pigments and lubricants e.g. graphite or molybdenum disulphide (present usually in an amount of 1 to 25% by weight of resin), accelerators, antistaining agents and stabilizers, e.g. calcium stearate and magnesium oxide may also be present if desired, as may aluminium, zinc, titanium dioxide, polytetrafluoroethylene flame retardants, fumed silica or Bentonite such as are described in German OLS 2402928. The cured products containing the lubricants can be used as gear wheel or shaft coatings and in the manufacture of self lubricated bearings.

Instead of the above type of curing agents, epoxides having at least two epoxide groups preferably those with at least one and especially two epoxy groups fused to a cycloaliphatic ring can be used, generally in amounts of 24-150% by weight of resin, giving a ratio of phenolic groups in the resin to epoxide groups of 1:2 to 2:1 e.g. 1:1.2 to 1.2:1 especially about 1:1. Further details of the types of epoxides, their amounts and the methods of curing are given in British Patent Specification Nos. 1305551 and 1365936 and German OLS 2402928. The cured products have high strength retention at high temperatures.

Alternatively, the nitrogenous curing agents of German OLS 2402928 and British Patent application 15240/75 which corresponds to U.S. application Ser. No. 604,434 filed Aug. 13, 1975 now U.S. Pat. No. 4,108,822 and published Japanese application No. 18758/77 can be used to cure the resin.

Finally the resin may be reacted with epichlorhydrin to form a glycidyl epoxide which can be cured with conventional epoxide curing agents as described in British Patent Specification No. 1169045.

The invention is illustrated in the following Examples 1-4.

EXAMPLE A PREPARATION OF P-XYLYLENE DIACETATE 438 gms (2.5 moles) of p-xylylene dichloride were added slowly to a refluxing solution of 539 gms (5.5 moles) of anhydrous potassium acetate in 2000 mls of glacial acetic acid. The resultant mixture was refluxed for a further 2 hours and then cooled. The solution was extracted several times with hot benzene, and the benzene extracts were washed with water until neutral. After distilling off the benzene, the residue was recrystallised from petroleum ether to yield 350 gms of p-xylylene diacetate.

EXAMPLE 1

99.9 gms (0.45 moles) of p-xylylene diacetate were reacted with 74.3 gms (0.675 moles) of resorcinol in the presence of 0.1 mls of diethyl sulphate. On heating to 135° C. acetic acid began distilling over and heating was continued to 195° C. when no more volatiles were being removed. A vacuum was then applied but very little volatile material was removed. The reaction product was then cooled to 160° C. and poured into an aluminium tray where it set to a hard brown solid. This had a softening point of 126° C.

10 grams of the solid product were powdered and intimately mixed with 1 gram of hexamine. On heating at 160° C. for ten minutes, curing took place to produce a hard, infusible, insoluble mass.

EXAMPLE 2

111 gms (0.5 moles) of p-xylylene diacetate and 7.5 gms (0.75 moles) of phenol were reacted together under reflux at about 140°-165° C. in the presence of 0.1 mls of diethyl sulphate. After three hours, the acetic acid formed was distilled off by heating the mixture up to 180° C. The final traces of acid were removed by applying a vacuum of about 1 mm Hg. The product on cooling was a brown solid having a softening point of 73° C.

10 gms of the solid resin were powdered and intimately mixed with 1.25 gms of hexamine. On heating at 180° C. for 15 minutes curing took place to produce a hard infusible, insoluble mass.

EXAMPLE 3

202 g (0.91 moles) of p-xylylene diacetate prepared as described in Example A and 128 g (1.37 moles) of phenol were charged into a flask. 1.0 cm$^3$ of diethyl sulphate was added and the temperature was increased to 140° C. At this temperature a small exotherm took place. When this had subsided the temperature was increased slowly to 180° C. as the acetic acid formed by the reaction was distilled off. Finally the temperature was increased to 200° C. to volatilize any unreacted phenol. On cooling the product was a brown solid having a softening point of 74° C.

The following solution was prepared from the brown solid (210 g), methyl ethyl ketone (193 g), industrial methylated spirits (64 g) and hexamine (26.2 g)

Thus the solids content of this solution was 45% and the hexamine content was 12½% based on the weight of resin (the brown solid). This solution was used to impregnate Marglass 116T/P705 glasscloth in a coating oven. The impregnated glass cloth was precured for 10 minutes at 134° C. A laminate was produced from 10 plies of the prepreg, by pressing for 1 hour at 175° C. and 1000 psi and then postcuring to 250° C. over 23 hours. The resin content of the laminate was 29.5%.

Flexural strength measurements were made on the laminates at room temperature and 250° C. before and after ageing at 250° C. The results obtained were as follows:

| | Flexural strengths in psi | |
|---|---|---|
| | RT | 250° C. |
| Initial | 91,000 | 40,000 |
| After 24 hrs at 250° C. | 86,700 | 59,800 |
| After 48 hrs at 250° C. | 90,400 | 61,700 |
| After 100 hrs at 250° C. | 95,000 | 65,900 |
| After 250 hrs at 250° C. | 81,800 | 57,500 |

These results are comparable with those from the resin based on the corresponding amount of p-xylylene glycol dimethyl ether instead of the diacetate.

EXAMPLE B PREPARATION OF P-XYLYLENE GLYCOL 440 g (2.52 moles) of p-xylylene dichloride, 637 g (4.57 moles) of anhydrous potassium carbonate and 6 liters of water were charged to a flask. The temperature was raised until refluxing began at 103° C. and this temperature was maintained for 5 hours with the contents of the flask being stirred. Approximately 3 liters of water were then removed by distillation. Upon cooling to room temperature white crystals of p-xylylene glycol appeared. The p-xylylene glycol was obtained by filtration and was recrystallised from hot water.

PREPARATION OF P-XYLYLENE DI-BENZENESULPHONATE 265 g (1.5 moles) of benzene sulphonyl chloride, 103.5 g (0.75 moles) of the p-xylylene glycol prepared above and 180 g of 33% w/w sodium hydroxide solution (i.e. 1.5 moles NaOH) were charged to a flask. After gentle heating an exotherm occurred, the temperature rising to 110° C. A yellowish-green solid precipitated and this was filtered off and washed with water to remove all the sodium chloride formed by the reaction. When dry the p-xylylene di-benzenesulphonate was yellow in colour and decomposed to a black solid at about 240° C.

EXAMPLE 4

94 g (1 mole) of phenol and 279 g (0.67 mole) of p-xylylene di-benzenesulphonate prepared in Example B were charged to a flask. 200 g of 1,2-dichlorobenzene was added to give a stirrable solution and 0.2 cm³ diethyl sulphate was added as a catalyst. The contents of the flask were stirred as the temperature was raised to 145° C. At this temperature the solution began to thicken. The temperature was slowly increased to 170° C. and then the 1,2-dichlorobenzene was distilled off under vacuum the final temperature being 200° C. A brown resinous material was left. Addition of methyl ethyl ketone to this resinous material gave a solution of resin and a white precipitate, which was filtered off. After evaporation of methyl ethyl ketone from the filtrate, a brown solid resin remained with a softening point of 76° C.

0.6 g of hexamine was mixed with 5.0 g of the above resin in an aluminium dish which was placed in an oven at 180° C. for 5 minutes. A hard, brown, insoluble, infusible mass resulted.

EXAMPLE C

The following reactants were placed in a resin pot.

| Acetic acid | 140 g |
|---|---|
| Potassium acetate | 27 g |
| p-xylene | 27 g |
| palladium acetate | 0.9 g |
| carbon | 8.0 g |
| tin (II) acetate | 3 g |

The mixture was stirred and warmed to reflux and a steady stream of air (20 L/hr.) was passed through the mixture. Samples (2 mls.) were removed periodically and centrifuged, then poured into water (5 mls.) and the organic layer analysed by vapour phase chromatography. After 24 hrs. very little organic layer was present, and the total volume had considerably diminished due to evaporation of the xylene. The diacetate was detectable after 2 hours and steadily increased in concentration, being 20% of the mixture after 24 hrs. The reaction was then stopped, and the reaction mixture centrifuged. The liquid phase was poured into water (400 mls.) and extracted with ether/methylene dichloride (1:1) (1×200 mls., 2×100 mls.). The combined extracts were washed with saturated sodium bicarbonate solution and sodium chloride solution, dried (MgSO$_4$) and distilled on a short fractional distillation column. 12 g of material b.p.>100° C. remained which vapour phase chromatography showed to be 30% p-xylene, 50% p-xylylene acetate, 20% $\alpha,\alpha'$ diacetate with only a trace of other product. Increasing the reaction time with recovery of evaporated xylene and return of it to the reaction mixture increases the proportion of $\alpha,\alpha'$-diacetate in the reaction product.

The p-xylylene $\alpha,\alpha'$-diacetate can then be reacted with phenols as described in Examples 1–3.

We claim:

1. A process for preparing a curable resin containing phenolic groups, which comprises reacting
   (1) an aralkylene ester of formula $R'(CH_2OYR\cdot)_a$, wherein $R'$ is a radical selected from the group consisting of divalent or trivalent aromatic hydrocarbyl groups and aromatic hydrocarbyl-oxy-aromatic hydrocarbyloxy groups, each of which may be substituted with at least one substituent selected from the group consisting of alkyl of 1–4 carbon atoms, halogen atoms and a phenyl group, $R\cdot$ is a radical selected from the group consisting of alkyl groups of 1 to 6 carbon atoms and aryl groups of 6–13 carbon atoms, Y is a radical selected from the group consisting of carbonyl and sulphonyl groups, and a is 2 or 3, with
   (2) a molar excess of a phenolic component which also may be substituted by non-hydroxylic substituents which are inert under the reaction conditions, said reaction being carried out in the presence of a catalyst for condensation of ester groups with nuclear hydrogen atoms in the phenolic compound, said catalyst being selected from Friedel Crafts type catalysts, and dialkyl sulphates with 1–6 carbon atoms in each alkyl group, at a temperature between 100° and 200° C.

2. A process according to claim 1 which comprises reacting said ester and said phenolic component in the presence of a Friedel Crafts catalyst.

3. A process according to claim 1 which comprises reacting said ester and said phenolic component in the presence of a catalyst which is a dialkyl sulphate with 1 to 6 carbon atoms in each alkyl group.

4. A process according to claim 1 wherein said ester is of the formula $R'(CH_2OOCR_1)_a$.

5. A process according to claim 4 wherein R· is an alkyl group of 1 to 6 carbon atoms.

6. A process according to claim 5 wherein said ester has the formula R'(CH$_2$OOCCH$_3$)$_a$.

7. A process according to claim 1 where R' is a p-phenylene group.

8. A process according to claim 1 wherein said ester is reacted with 1.3–3.0 moles of phenolic compound per mole of ester.

9. A process according to claim 1 wherein said phenolic compound is selected from the group consisting of phenol, resorcinol, catechol, 4 methyl catechol and mixtures of any of these compounds.

10. A process according to claim 1 wherein said ester is of formula R'(CH$_2$OOCCH$_3$)$_2$ and is made from a compound of formula R'(CH$_3$)$_2$ by catalysed air oxidation in the presence of acetic acid and stannous and palladous acetate.

11. A process according to claim 11 wherein said ester is prepared from a halide of formula R'(CH$_2$X)$_a$, where X is chlorine or bromine by reaction with a salt of formula MOOCR$_1$, where M is sodium or potassium and R· is an alkyl group of 1 to 6 carbon atoms, in solution in the corresponding carboxylic acid of formula R·COOH.

12. A process according to claim 11 wherein said carboxylate ester of formula R'(CH$_2$OOR·)$_a$, where a is 2 and R·is a methyl group is reacted with 1.3–3 moles of said phenolic compound per mole of ester in acetic acid solution to produce the resin and by-product acetic acid, acetic acid is distilled off and treated with a base selected from the group consisting of sodium and potassium carbonates and bicarbonates to make a solution of the sodium or potassium acetate in acetic acid for further reaction with said aralkylene halide of formula R'(CH$_2$Cl)$_2$.

13. A process according to claim 9 wherein p-xylylene dichloride is reacted with sodium or potassium acetate in acetic acid solution to give a solution containing p-xylylene diacetate, which is heated at 100°–200° C. with 1.4–2.0 moles of said phenol per mole of diacetate in the presence of diethyl sulphate as catalyst.

* * * * *

UNITED STATES PATENT AND TRADEMARK OFFICE
CERTIFICATE OF CORRECTION

PATENT NO. : 4,181,791
DATED : January 1, 1980
INVENTOR(S) : ALFRED G. EDWARDS et al It is certified that error appears in the above—identified patent and that said Letters Patent is hereby corrected as shown below:

Column 7, line 44: replace "24-150%" with --25-150%--.

Column 8, line 27: replace "7.5" with --70.5--.

Signed and Sealed this

Twenty-seventh Day of April 1982

[SEAL]

Attest:

GERALD J. MOSSINGHOFF

Attesting Officer

Commissioner of Patents and Trademarks